Figure 1:
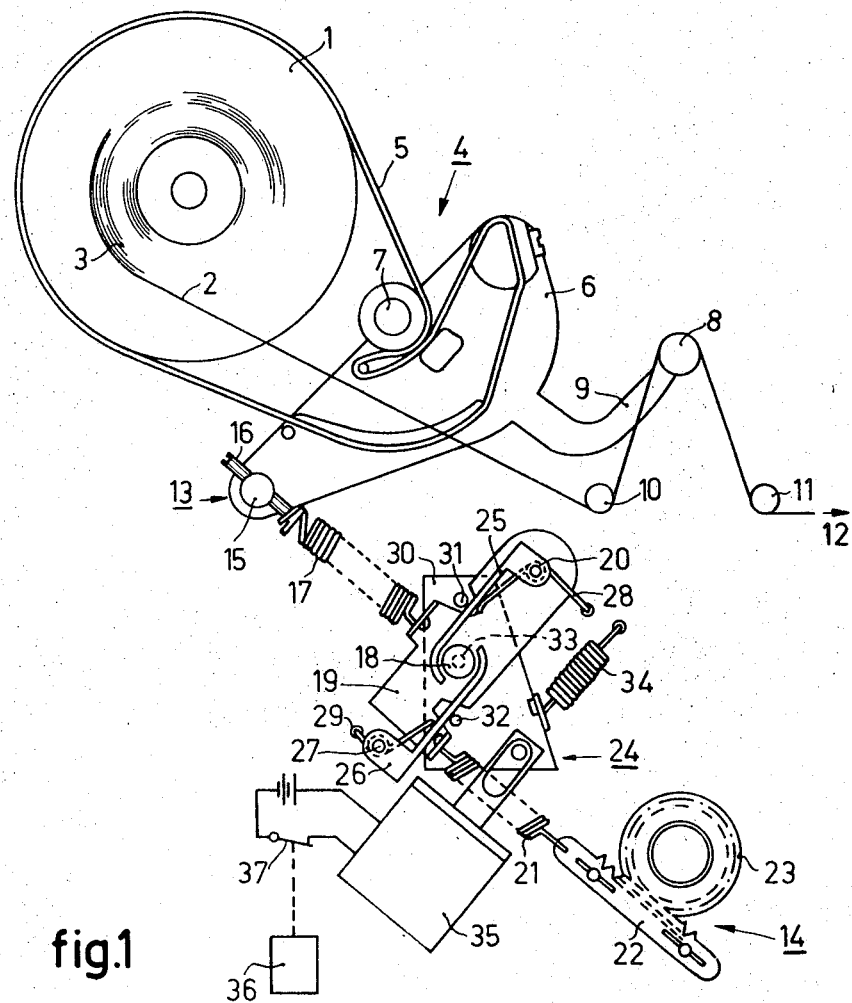

United States Patent

[11] 3,539,129

[72] Inventors Franz Schmidt
  Wien, Austria;
  Peter Willibrord Bogels, Eindhoven,
  Netherlands; and Germann Podest, Wien,
  Austria
[21] Appl. No. 722,694
[22] Filed April 19, 1968
[45] Patented Nov. 10, 1970
[73] Assignee By mesne assignments, to
  U. S. Philips Corporation
  New York, New York
  a corporation of Delaware.
[32] Priority April 24, 1967
[33] Austria
[31] A 3,833/67

TAPE TENSION ADJUSTING APPARATUS
8 Claims, 4 Drawing Figs.
[52] U.S. Cl. .................................................... 242/189,
  242/75.43

[51] Int. Cl. ...................................................... B65h 59/38,
  B65h 25/22
[50] Field of Search ............................................ 242/75.43,
  75.44, 189, 204, 156; 274/4, 11

[56] References Cited
UNITED STATES PATENTS
3,374,962 3/1968 Dunsheath .................... 242/189
3,380,680 4/1968 Dunsheath et al. ............ 242/189

*Primary Examiner*—George F. Mautz
*Attorney*—Frank R. Trifari

ABSTRACT: In a recording and playback apparatus for a record carrier such as a magnetic tape, the apparatus including at least one turntable about which the tape is wound, there is provided brake means for regulating rotation of the turntable, and first and second adjusting means for operating the brake to vary tape tension during recording and playback respectively, the adjustment setting of the first means being reuseable during subsequent recording without readjustments.

INVENTORS
FRANZ SCHMIDT
PETER W. BOGELS
GERMANN PODEST
BY
AGENT

INVENTORS
FRANZ SCHMIDT
PETER W. BOGELS
GERMANN PODEST

3,539,129

TAPE TENSION ADJUSTING APPARATUS

The invention relates to a recording and playback apparatus for a record carrier in the form of a tape which apparatus has at least one turntable provided with a brake and in which a spring biased lever for operating the brake is adjustable by a device which senses the tension of the tape and in which for a basic setting of the brake this lever is manually adjustable through setting means; the invention is characterized in that two setting means for the basic setting of the brake are provided, of which the first serves to set the brake once for all while the second, in the playback condition of the apparatus, is continuously adjustable and, in the recording condition of the apparatus, is compelled by a setting and locking device of the apparatus to move into a preset position in which it is then held. The brake setting by means of the sensing device results in that in recording operation of the apparatus the tension of the record carrier, which hereinafter will be referred to as the tape, is always the same. When in playing back the basic setting of the brake is altered in order to match the tape tension to the tape being played, then for recording on another tape the tension must be readjusted, since in each apparatus preferably the same tension is always used in recording. This is a comparatively laborious and time consuming procedure.

In order to simplify this procedure, according to the invention an apparatus of the above-mentioned kind is characterized in that two setting means for the basic setting of the brake are provided of which the first serves to set the brake once for all while the second, in the playback condition of the apparatus, is continuously adjustable and, in the recording condition of the apparatus, is compelled by a setting and locking device of the apparatus to move into a preset position in which it is then held. Thus the apparatus will always operate with the same preset tape tension so that all its recordings are made at the same tape tension, whereas for playback the tape tension is continuously adjustable so that tapes on which records have been made at another tension can be played back at the correct tension and annoying variations in the reproduction are avoided. The measure in accordance to the invention is of particular importance for apparatus for recording and playback of video informations, since in such apparatus the magnetic head always must exactly follow the respective track.

A simple and efficient device is obtained by an arrangement in which one of the ends of a spring acts on the brake operating lever, the point of the lever at which the spring acts carrying the first setting means, for example an adjusting screw, for varying the tension of the spring, the other end of the spring being operatively connected to a pin which through the second setting means is continuously adjustable for varying also the spring tension and which pin can be acted upon by the setting and holding device. In such an arrangement it has proved of advantage for the setting and holding device to comprise two arms which each are adapted to pivot about a fixed pivot and loosely embrace the pin each on one side and, when the apparatus is switched to recording, are arranged to move towards each other so as to grip the pin and hold it in a fixed position. In another advantageous embodiment the setting and holding device comprises a slide having a triangular recess into which the pin projects and which is arranged so that the base of the triangle is substantially parallel to the direction of adjustment of the pin, the adjustment of the slide for setting and holding the pin in the corner of the triangle opposite the base being effected substantially in a direction at right angles to this base from the said corner towards the base.

The setting and holding device may also be designed for electric operation. In this case the device preferably comprises two coaxially arranged armature portions each adapted to be displaced in a solenoid against the action of a spring, the pin passing through a slot in the solenoid so as to project between the armature portions and, on energization of the solenoid, to be held by them.

Figure 4:
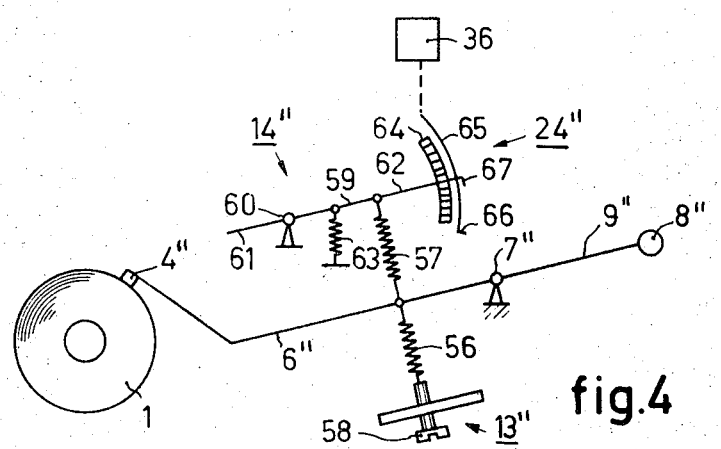
Figure 2:
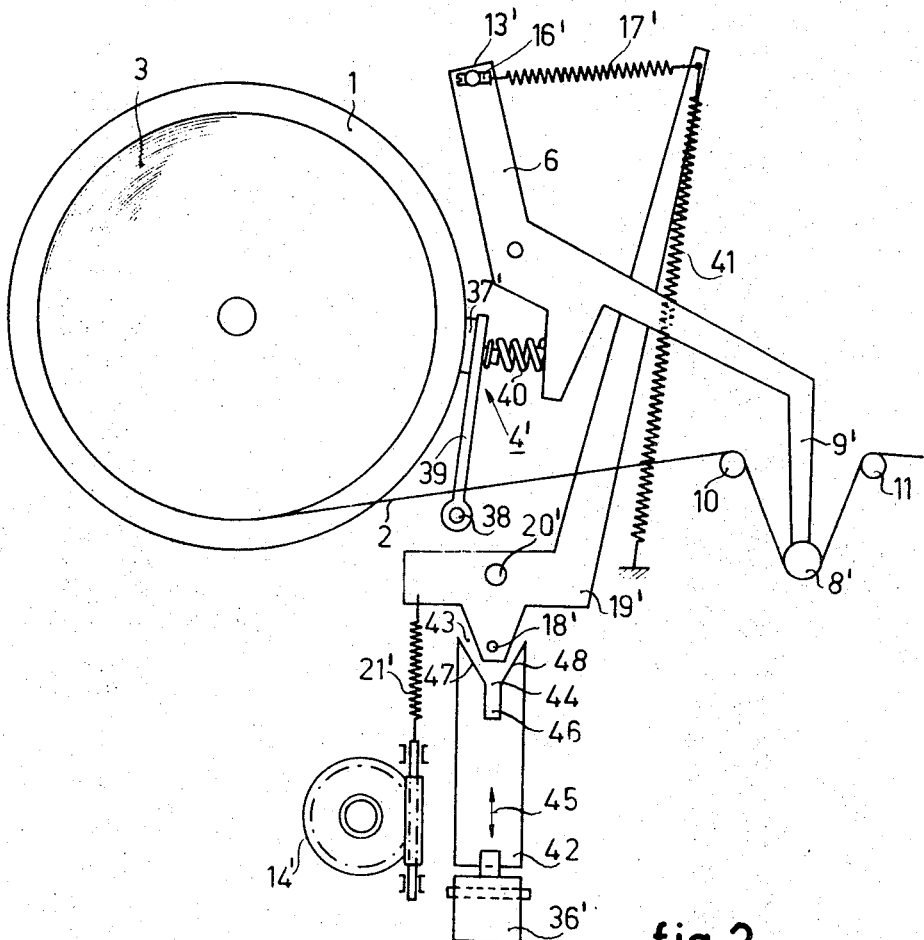
Figure 3:
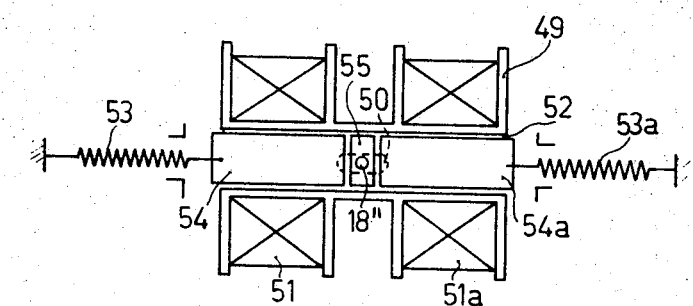

In order that the invention may readily be carried out a few embodiments thereof, to which the invention is not limited, however, will now be described, further advantageous embodiments being pointed out with reference to the accompanying drawings, in which FIG. 1 is a plan view showing a braking arrangement for a turntable of a recording and playback apparatus for a magnetic recording tape in which a setting and holding device is operated by electromagnetic means, FIG. 2 is a plan view showing a braking arrangement for a turntable of a recording and playback apparatus for a magnetic recording tape in which a setting and holding device is operated by mechanical means, FIG. 3 is a partial plan view showing a setting and holding device in the form of a solenoid and, FIG. 4 is a schematic plan view showing an arrangement in which basic setting of a lever for actuating a brake is effected by means of two springs which counteract each other.

In FIG. 1, reference numeral 1 denotes a turntable on which is placed a record carrier 2 in the form of a coil of tape. A band brake 4 engages the periphery of the turntable. The band 5 is connected to a brake operating lever 6 adapted to pivot about a spindle 7. The position of the lever 6 so controls the tension of the band that the desired braking action is obtainable. The lever 6 is provided with a sensing device for detecting the instantaneous tension in the tape 2 in the form of a lever 9 which projects from the lever 6 and carries a tape guide roller 8 and cooperates with two fixed tape guide pins 10 and 11 in a manner such that the tape 2, viewed in its direction of movement indicated by the arrow 12, is successively guided passed the pin 10, the roller 8 and the pin 11. Thus the tape tension is known manner influences the position of the brake actuating lever 6 through the arm 9.

For a basic setting of the brake the lever 6 is moved to a suitable position. For this purpose two setting means 13 and 14 are provided. The first setting means 13 comprises a pin 15 provided on the lever 6 and a screw 16 adapted to be turned in a screwed hole in the pin. To this screw 16 is secured one of the ends of a spring 17, the other end of which is operatively connected to a pin 18. The pin 18 is secured to a lever 19 which is adapted to pivot about a fixed spindle 20 and is acted upon by the spring 17. The end of the lever more remote from the fulcrum is acted upon by one end of a spring 21 the other end of which is connected to a straight toothed rack 22 adapted to move in the direction of its length. The rack teeth cooperate with a pinion 23 adapted to be turned by means of a knob, thus constituting the second setting means 14.

A setting and holding device 24 comprises two arms 25 and 26, the arm 25 being adapted to pivot about the spindle 20 and the arm 26 about a fixed spindle 27. These arms are arranged one on each side of the pin 18, their free ends being bent and embracing the pin. Each arm is pushed away from the pin 18 by a spring 28 and 29 respectively. A fork 30 is formed by a plate to which are secured two pins 31 and 32 which extend parallel to the pin 18 and embrace the arms 25 and 26. The plate itself is adapted to pivot about a spindle 33 arranged coaxially with the pin 18. In order to pivot the plate against the action of a spring 34 it is attached to the armature of an electromagnet 35 the energizing circuit of which includes a switch 37 adapted to be operated by a switch 36 for switching the apparatus to the recording condition.

FIG. 1 shows the device in the recording condition. The energizing circuit of the electromagnetic 35 is completed, its armature is attracted and hence the fork 30 is pivoted so that the pins 31 and 32 press the arms 25 and 26 towards one another so as to grip around the pin 18. This prevents displacement of the pin 18, constituting thereby a fixed point for the spring 17. By turning the screw 16 a desired basic setting of the lever 6 for operating the brake 4 is obtainable. Thus this basic setting for the recording condition is chosen once for all by the first setting means 13.

When the apparatus is switched to the playback condition, the switch 36 is in its rest position so that the switch 37 is open and the magnet 35 is not energized and hence its armature releases the fork 30. The spring 34 now pivots the plate of the fork to a position such that the pins 31 and 32 release the arms 25 and 26. The springs 28 and 29 have the effect that the arms 25 and 26 are pivoted away from, and hence release, the pin 18. As a result the spring 21 acts upon the lever 19 and is capable of changing the position of the pin 18. A change in position of the pin 18, however, causes a change in the tension of the spring 17 and hence a change in the basic setting of the brake 4. Thus, in the playback condition of the apparatus the basic setting of the brake is continuously adjustable by means of the knob for operating the pinion 23 of the second setting means 14 so that playback can always be effected with the proper tape tension.

When the apparatus is again switched to the recording condition, the setting and holding device 24 returns the pin 18 to its predetermined position, in which it is held. As a result, the basic setting of the brake is restored to the preselected adjustment required for recording.

In both operating conditions, there is superimposed on the basic setting of the brake, which is adjustable in the above mentioned manner, the variation in the braking force which corresponds to the position of the arm 9 which senses the tension of the tape so that this tension is maintained constant.

This ensures that in making a recording by means of an apparatus the same tape tension is always used, whereas for playback by means of this apparatus the tape tension can be matched to the tension used in recording, for example, by means of a different apparatus. The device also enables the extension of a tape due to frequent use to be compensated for.

In the embodiment shown in FIG. 2 the brake 4' is a block brake. A brake shoe 37' is provided on a lever 39 which is adapted to pivot about a spindle 38 and is adjustable by the operating lever 6' through a spring 40.

The first setting means 13' for adjusting the basic setting of the brake once for all again comprises an adjusting screw 16' to which is secured one end of a spring 17' the other end of which is attached to a lever 19' which carries a pin 18', is adapted to pivot about spindle 20' and is also acted on, through a spring 21', by a second setting means 14'. To the lever 19' is also connected a spring 41 which provides a restoring force.

A setting and holding device is constituted by a slide 42 which is positively coupled to a switch 36' for switching the apparatus into the recording condition, is displaceable in its direction of length and has a triangular recess 43 into which the pin 18' projects. The recess is shaped so that the base of the triangle is substantially parallel to the path along which the pin 18' may be displaced by the second setting means 14 and which is in the form of an arc of a circle about the spindle 20'. In the corner 44 opposite the base of the triangle, the recess 43 terminates in a slot 46 extending in the direction 45 in which the slider 42 can slide.

The position of the device shown in FIG. 2 corresponds to the recording condition. By operating the second setting means 14' the tension of the spring 21' is altered and hence the lever 19' is pivoted so that the basic setting of the brake is influenced. The pin 18' follows the pivotal movement of the lever 19' and hence is displaced within the triangular recess 43 in the slide 42. When the apparatus is switched to the recording condition, the switch 36' displaces the slide 42 towards the pin 18'. As a result, the pin engages one of the two sidewalls 47 and 48 of the triangular recess and by this sidewall is guided into the corner 44 of the triangle and finally into the slot 46. Thus the pin 18' is moved into a position in which it is held. The lever 19' also assumes a position from which it cannot be pivoted. Thus, the selected basic setting of the brake 4' is adjusted by the first setting means 13'. The slot 46 ensures that the pin 18' is firmly held; it would, however, be sufficient for it to be held in the corner 44 of the triangle.

The setting and holding device shown in FIG. 3 operates electromagnetically by means of a solenoid 49. The pin 18" projects through a slot 50 into a space 52 which is enclosed by coils 51 and 51a and in which armatures portions 54 and 54a biased by springs 53 and 53a respectively are displaceable each on one side of the pin. The pin 18 is guided in the space 52 by a guide member 55 which is provided at its free end and has the same cross section as the armatures portions.

When the apparatus is switched to the playback condition, the springs 53 and 53a slightly withdraw the armature portions 54 and 54a from the space 52 of the solenoid so that the pin 18" can move freely. When the apparatus is switched to the recording condition, the coils 51 and 51a are connected into circuit and hence the solenoid is energized so that the armature portions 54 and 54a are drawn into the space 52 until they clamp the guiding member 55 and hence the pin 18" and hold it in a predetermined position.

In the device shown in FIG. 4, each setting means 13" and 14" acts through an associated spring 56 and 57 respectively on the lever 6" for operating the brake 4", the springs counteracting each other. The first setting means 13" comprises an adjusting screw 58 which is adapted to be turned in a member rigidly secured to the apparatus and has its free end connected to the spring 56 attached to the lever 6". Thus, the basic setting of the brake is influenced by turning the screw.

The second setting means 14" comprises a lever 59 adapted to pivot about a fulcrum 60. One arm 61 of the lever acts as an operating member and the other 62 cooperates, by means of a spring 63, with a locking device 64 by which the lever can be held in any suitable position. One end of the spring 57 is connected to the lever 6" and the other end to the lever 59 so that adjustment of the latter influences the basic setting of the brake through the operating lever 6".

The setting and holding means 24" comprises an arm 65 which extends below the lever 59 through the entire range thereof and at the end, which the lever 59 reaches when the spring 57 is relaxed as far as possible, has an abutment 66 which in this position can engage a stop 67 of the lever 59. The arm 65 is so coupled with the switch 36 for switching the apparatus to the recording condition that on operation of the switch 36 the arm 65 is lifted so that the lever 59 is disengaged from the locking device and moves into engagement with the abutment 66, pivoting in a direction about the fulcrum 60 through an angle such that the spring 57 is subjected again to a predetermined tension. Thus, the lever 59 assumes a predetermined position and is held in this position, so that the basic setting of the brake is again determined by adjusting the screw 58 once for all.

Obviously many variations of the described embodiments are possible without departing from the scope of the invention, especially with respect to the manner in which the setting and holding device cooperates with the setting means acting on the brake operating lever.

I claim:

1. In a recording and playback apparatus for use with a record carrier such as a tape, the apparatus including at least one turntable about which the tape is wound, a brake for regulating rotation of the turntable, and a lever with means for sensing the tape tension and operating the brake accordingly, the improvement in combination therewith comprising:

a. a first adjusting means including a first spring engageable to said lever for varying and setting the spring force in said first means and thereby the tape tension when the apparatus is used for recording;

b. releasable locking means for maintaining the setting of said first means; and c. second adjusting means cooperatively engaging the first means for further adjusting tape tension when the locking means is released and the apparatus is used for playback, the second adjusting means including a second spring, and means for varying the tension in said second spring, disengagement of the second means rendering the first means subject to its prior spring setting without readjustment when the apparatus is again used for recording, said locking means comprises a movable member to which one portion of said first spring is attached with a remote portion of the first spring attached to the lever, the movable member having a fixed position during recording and being engaged and adjustably movable by said second spring of said second adjusting means during playback.

2. Apparatus as defined in claim 1 wherein said second means is continuously adjustable.

3. Apparatus as defined in claim 1, further comprising power means for moving said member of said locking means, and a switch means for activating said power means.

4. Apparatus as defined in claim 3, wherein the power means includes a solenoid with two coaxially disposed armatures displaceable to engage said movable member.

5. Apparatus as defined in claim 1 wherein said movable member is a first plate with an extending part, and the locking means further comprises:
   a. at least one holding element for releasably engaging said part and thereby fixing the position of said first plate;
   b. electric power means for driving said holding element; and
   c. switch means for activating said power means.

6. Apparatus as defined in claim 5 wherein said holding elements are two pivotal arms spring-biased for disengagement from said extending part, the locking means further comprises a second plate having two lugs corresponding to said arms, the second plate pivoted by the power means during recording whereby said lugs engage and pivot the arms into holding engagement with said extending part.

7. Apparatus as defined in claim 5 wherein said holding element is slidable and has a slot in which said extending part is engageable during recording, the slidable element being moved to a disengaging position during playback.

8. Apparatus as defined in claim 1 wherein the second adjusting means also directly engages said lever.